(12) United States Patent
Katsuyama et al.

(10) Patent No.: US 8,081,213 B2
(45) Date of Patent: Dec. 20, 2011

(54) TEST SUPPORT SYSTEM AND IMAGE PROCESSING CONTROLLER

(75) Inventors: Hidekazu Katsuyama, Osaka (JP); Toshihiro Konaka, Osaka (JP)

(73) Assignee: Keyence Corporation, Osaka (JP)

( * ) Notice: Subject to any disclaimer, the term of this patent is extended or adjusted under 35 U.S.C. 154(b) by 711 days.

(21) Appl. No.: 12/256,772

(22) Filed: Oct. 23, 2008

(65) Prior Publication Data

US 2009/0128627 A1  May 21, 2009

(30) Foreign Application Priority Data

Nov. 16, 2007  (JP) .................................. 2007-298031

(51) Int. Cl.
*H04N 7/18* (2006.01)
(52) U.S. Cl. ........................................................ 348/135
(58) Field of Classification Search ............... 348/87, 348/92, 129, 135, 188, 189, 222.1; 382/199
See application file for complete search history.

(56) References Cited

U.S. PATENT DOCUMENTS

| | | | |
|---|---|---|---|
| 6,535,630 B1 | 3/2003 | Saeki | |
| 6,549,655 B1 | 4/2003 | Ikushima et al. | |
| 6,665,441 B1 | 12/2003 | Nishio | |
| 6,704,441 B1 | 3/2004 | Inagaki et al. | |
| 6,744,913 B1 * | 6/2004 | Guest et al. | 382/145 |
| 6,774,909 B1 | 8/2004 | Nishio | |
| 6,807,288 B2 | 10/2004 | Inagaki | |
| 6,954,550 B2 * | 10/2005 | Fujieda | 382/199 |
| 7,215,816 B2 | 5/2007 | Ikushima | |
| 7,274,812 B2 | 9/2007 | Saeki | |
| 7,403,218 B2 | 7/2008 | Saeki | |
| 2005/0162517 A1 * | 7/2005 | Fujihara et al. | 348/187 |
| 2007/0013772 A1 * | 1/2007 | Tham et al. | 348/87 |
| 2008/0266391 A1 * | 10/2008 | Lee et al. | 348/135 |

FOREIGN PATENT DOCUMENTS

JP   09-288568   11/1997

OTHER PUBLICATIONS

U.S. Appl. No. 12/256,123, filed Oct. 22, 2008.
U.S. Appl. No. 12/256,708, filed Oct. 23, 2008.

* cited by examiner

*Primary Examiner* — Frantz Jean
(74) *Attorney, Agent, or Firm* — Kilyk & Bowersox, P.L.L.C.

(57) ABSTRACT

There is provided a test support system having facilitated association of an execution log with processing of each unit in a case of creating a control program by blocking a series of processing procedure into a plurality of units, the system being configured such that a program creation apparatus generates a control program for an image processing controller based upon a flowchart generated by arranging the processing units, including an image pick-up unit and a measurement unit, on an execution flow, the image processing controller includes the log collecting section holds an execution log in association with the processing unit constituting the control program.

9 Claims, 14 Drawing Sheets

FIG. 10B

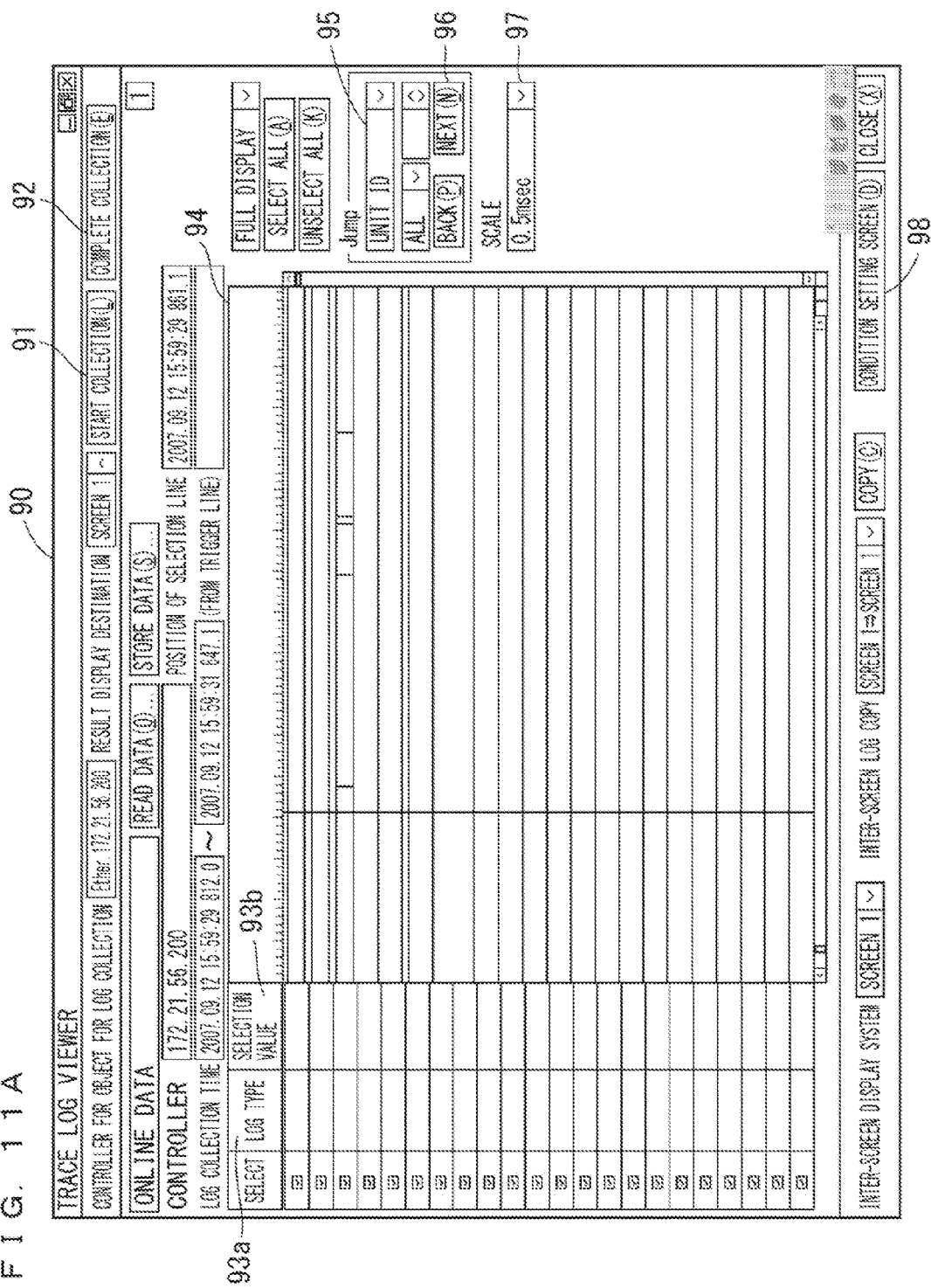

FIG. 11B

| SELECT | LOG TYPE | SELECTION VALUE |
|---|---|---|
| ☑ | TEST SETTING | SD1-0000 |
| ☑ | FLOW (A) | 577063 |
| ☑ | UNIT (A) | U0003:COLOR TEST |
| ☑ | UNIT00 Back 0 | Low |
| ☑ | UNIT01 Black 0 | Low |
| ☑ | UNIT02 Busy 0 | High |
| ☑ | UNIT03 ScanRead | High |
| ☑ | OUT04 WrgRea. | Low |
| ☑ | OUT05 WrgRea. | Low |
| ☑ | OUT06 WrBeta. | Low |
| ☑ | OUT07 WrBeta. | Low |
| ☑ | OUT08 WrBeta. | Low |
| ☑ | OUT09 WrBeta. | Low |
| ☑ | OUT10 WrBeta. | Low |
| ☑ | OUT11 WrBeta. | Low |
| ☑ | OUT12 WrBeta. | Low |
| ☑ | OUT13 WrBeta. | Low |
| ☑ | OUT14 WrBeta. | Low |
| ☑ | OUT15 WrBeta. | Low |
| ☑ | OUT16 WrBeta. | Low |
| ☑ | OUT17 WrBeta. | Low |
| ☑ | OUT18 WrBeta. | Low |

101 — SELECT
102 — LOG TYPE (FLOW)
103 — UNIT
104 — OUT 93a, 93b, 94, 110

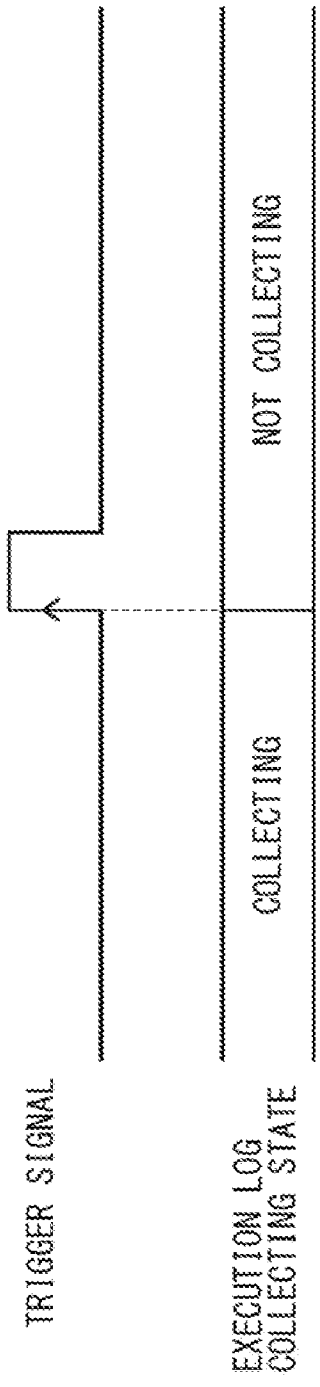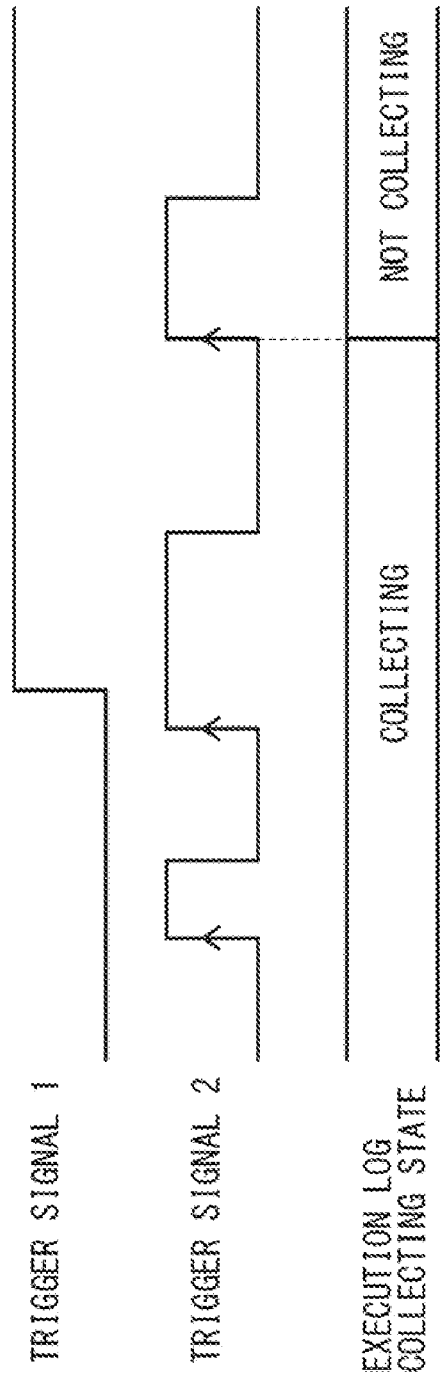

TEST SUPPORT SYSTEM AND IMAGE PROCESSING CONTROLLER

CROSS-REFERENCE TO RELATED APPLICATIONS

The present application claims foreign priority based on Japanese Patent Application No. 2007-298031, filed Nov. 16, 2007, the contents of which is incorporated herein by reference.

BACKGROUND OF THE INVENTION

1. Field of the Related Art

The present invention relates to a test support system and an image processing controller, and more particularly relates to an improvement in image processing controller that outputs a determination signal based upon a camera image obtained by photographing an object to be tested.

2. Description of the Related Art

As an image processing controller which performs image processing on a camera image obtained by photographing an object to be tested and outputs as a processing result a determination signal indicating a determination result based upon a shape, a position and a camera image of the object to be tested, or the like, one capable of changing a series of processing procedure is known (e.g. Japanese Unexamined Patent Publication No. H09-288568). Typically, a control program for making such an image processing controller execute a series of processing procedure is created by an editor (software) that operates on an information processing terminal such as a PC (personal computer). A user can transfer the created control program to the image processing controller, so as to perform a desired test on the object to be tested.

Generally, in a case where the image processing controller is actually operated by a control program created using the program creation apparatus as described above, it is necessary to check an execution log in order to verify whether or not a process could be completed within desired time, whether or not timing for executing a process and timing for inputting a signal are appropriate, or the like. The execution log is data showing in time series a terminal state at the time of executing a control program, and a signal state of a signal inputted or outputted from or to external equipment through an input/output terminal is held as the execution log. By analyzing such an execution log, it is possible to determine whether or not a test tact that is requested of the image processing controller can be met or whether or not processing is handled in an expected manner, so as to correct the control program.

However, in the conventional image processing controller, a terminal state sampled at the time of executing a control program is held simply as an execution log, in association with time information. There has thus been a problem in that, in a case where a control program is created by blocking a series of processing procedure into a plurality of units, an execution log is not easily associated with processing of each unit, making it difficult to determine in which order each processing was executed and when each processing was started and completed.

SUMMARY OF THE INVENTION

As described above, there has been a problem with the conventional image processing controller in that, in a case where a control program is created by blocking a series of processing procedure into a plurality of units, an execution log is not easily associated with processing of each unit, making it difficult to determine in which order each processing was executed and when each processing was started and completed.

The present invention was made in view of the above circumstances, and has an object to provide a test support system and an image processing controller having facilitated association of an execution log with processing of each unit in the case of creating a control program by blocking a series of processing procedure into a plurality of units. Especially, an object is to provide an image processing controller having facilitated determination as to in which order each processing was executed and when each processing was started and completed. Further, an object is to provide a test support system having improved an operability in displaying on an edition screen an execution log in association with a processing unit correspondingly to a time scale.

A test support system according to a first aspect of the present invention is a test support system including: a camera which photographs an object to be tested, to generate a camera image; the image processing controller which acquires the camera image from the camera, extracts a measurement result from the camera image, and determines a quality of the object to be tested based upon this measurement result, to output a determination signal; and a program creation apparatus which creates a control program of the image processing controller, and is configured such that the program creation apparatus includes a processing unit storing part for holding, as processing units, an image pick-up unit that acquires a camera image from the camera based upon an image pick-up trigger signal, and two or more measurement units that extract a measurement result from the camera image acquired by the image pick-up unit, a flow chart generating part for arranging the processing units on an execution flow that is started with a start symbol and completed with an end symbol, to generate a flowchart, a program generating part for generating a control program for the image processing controller based upon the flowchart, and a program transferring part for transferring the control program to the image processing controller, the image processing controller includes a program storing part for holding the control program, a program executing part for repeatedly executing the control program with an acquirement cycle of the camera image taken as a measurement cycle, a log collecting part for sampling a terminal state at the time of executing the control program, and holding the terminal state as an execution log shown in time series, and a log transferring part for transferring the execution log to the program creation apparatus, and the log collecting part holds the execution log in association with the processing unit.

In this test support system, a control program is repeatedly executed with an acquirement cycle of a camera image taken as a measurement cycle, and a terminal state at the time of executing the control program is held as an execution log. At that time, since an execution log is held in association with a processing unit, it can be analyzed in association with processing of each unit.

A test support system according to a second aspect of the present invention is configured such that, in addition to the above configuration, the execution log includes time information showing processing start and processing end of the processing unit. With such a configuration, since the execution log includes time information showing processing start time and processing end time, it is possible to determine in which order each processing was executed and when each processing was started and completed.

A test support system according to a third aspect of the present invention is configured such that, in addition to the above configuration, the execution log includes determination result information with respect to each of the processing units, the information showing a determination result of the quality of the object to be tested. With such a configuration, since the execution log includes determination result information with respect to each measurement unit, it can be analyzed with a determination result in the process of a series of processing procedure associated with a terminal state.

A test support system according to a fourth aspect of the present invention is configured such that, in addition to the above configuration, the processing unit storing part holds a branching unit that branches an execution flow into two or more branch flows as a processing unit, and the execution log includes a branch destination information showing a destination of branching by the branching unit. With such a configuration, since the execution log includes a destination of branching by the branching unit in the case of a control program including the branching unit, it is possible to easily determine which branch flow was executed after branching by the branching unit.

A test support system according to a fifth aspect of the present invention is configured such that, in addition to the above configuration, the log collecting part completes collection of the execution log based upon a determination result of the quality of the object to be tested in the measurement unit.

A test support system according to a sixth aspect of the present invention is configured such that, in addition to the above configuration, the log collecting part completes collection of the execution log based upon the time from processing start to processing end of the processing unit.

A test support system according to a seventh aspect of the present invention is configured such that, in addition to the above configuration, the log collecting part completes collection of the execution log based upon overflow of a measurement value or parameter setting error in the measurement unit.

A test support system according to an eighth aspect of the present invention is configured such that, in addition to the above configuration, the program creation apparatus includes: a log displaying part for displaying on an edition screen the execution log in association with a time scale; a unit select field displaying part for displaying a select field for selecting the processing unit; and a cursor shifting part for making a cursor jump on the execution log to a position of the processing unit selected in the select field. With such a configuration, since a cursor is made to jump on the execution log to a position of a processing unit selected in a select field, it is possible to improve the operability in displaying on an edition screen an execution log in association with a processing unit correspondingly to a time scale.

An image processing controller according to a ninth aspect of the present invention is used in a test support system including a camera which photographs an object to be tested, to generate a camera image, the image processing controller which acquires the camera image from the camera, extracts a measurement result from the camera image, and determines the quality of the object to be tested based upon this measurement result, to output a determination signal, and a program creation apparatus which creates a control program of the image processing controller, the program creation apparatus including a processing unit storing part for holding, as processing units, an image pick-up unit that acquires a camera image from the camera based upon an image pick-up trigger signal, and two or more measurement units that extract a measurement result from the camera image acquired by the image pick-up unit, a flow chart generating part for arranging the processing units on an execution flow that is started with a start symbol and completed with an end symbol, to generate a flowchart, a program generating part for generating a control program for the image processing controller based upon the flowchart, and a program transferring part for transferring the control program to the image processing controller. Specifically, the image processing controller includes: a program storing part for holding the control program, a program executing part for repeatedly executing the control program with an acquirement cycle of the camera image taken as a measurement cycle, a log collecting part for sampling a terminal state at the time of executing the control program, and holding the terminal state as an execution log shown in time series, and a log transferring part for transferring the execution log to the program creation apparatus, the image processing controller being configured such that the log collecting part holds the execution log in association with the processing unit.

According to the image processing controller and the program creation apparatus for an image processing controller in the present invention, since an execution log is held in association with a processing unit the execution log can be analyzed in association with processing of each processing unit. Particularly, since an execution log includes time information showing processing start and processing end of a processing unit, it is possible to facilitate determination as to in which order each processing was executed and when each processing was started and completed. It is therefore possible to facilitate association of an execution log with processing of each processing unit in the case of creating a control program by blocking a series of processing procedure into a plurality of processing units. Further, since a cursor is made to jump on the execution log to a position of a processing unit selected in the select field, it is possible to improve the operability in displaying on an edition screen an execution log in association with a processing unit correspondingly to a time scale.

BRIEF DESCRIPTION OF THE DRAWINGS

FIG. 10B is a view showing a part of FIG. 10A, showing an enlarged view of a display field 94;

FIG. 11A is a view showing an example of the operation of the PC 2 in the test support system 100 of FIG. 2, showing a log view window 90 where 0.5 msec per scale has been selected;

FIG. 11B is a view showing a part of FIG. 11A, showing an enlarged view of a display field 94; and FIGS. 12A and 12B are timing charts each showing an example of an operation of the image processing controller 11 in the test support system 100 of FIG. 2, and each shows a condition at the completing time of log collection in event trigger mode.

DETAILED DESCRIPTION OF THE PREFERRED EMBODIMENTS

<Test Support System>

Figure 1:
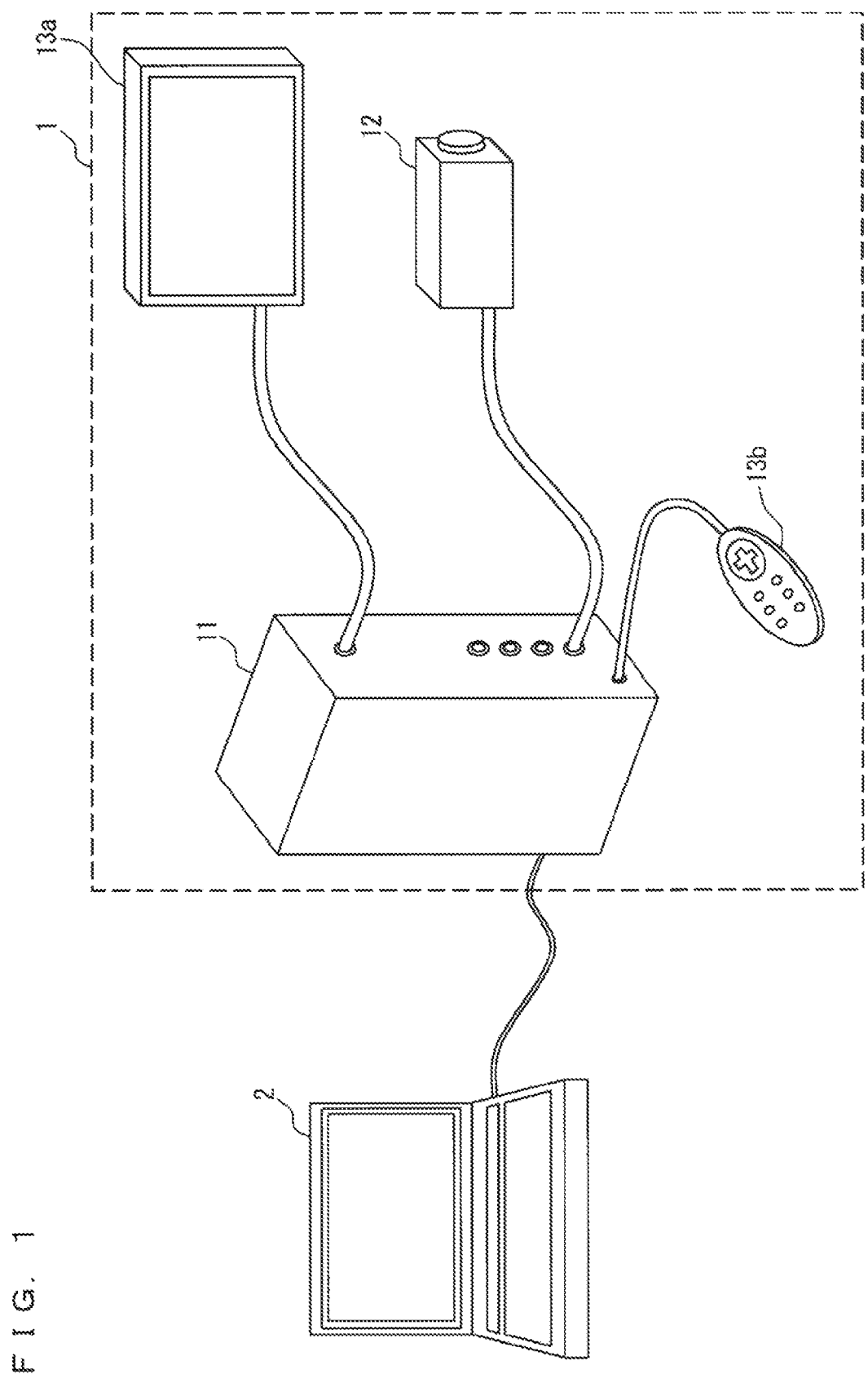
FIG. 1 is a perspective view showing a configurational example of a test support system according to an embodiment of the present invention.

FIG. 1 is a perspective view showing a configurational example of a test support system according to an embodiment of the present invention. This test support system includes an image processing apparatus 1 arranged on a conveyance line for an object to be tested, and a PC (personal computer) 2 which generates a control program for the image processing apparatus 1.

The image processing apparatus 1 includes an image processing controller 11, a camera 12, a display 13a, and an operational unit 13b, and is a sensor apparatus which outputs a determination signal based upon a camera image obtained from an object to be tested. This determination signal is inputted into a not shown PLC (Programmable Logic Controller) or the like and the image processing apparatus 1 is used as a FA (Factory Automation) sensor.

The camera 12 is an image-pickup device which photographs an object to be photographed, generates image data, and outputs the data as a camera image, and is detachably connected to the image processing controller 11. The camera 12 is arranged above the conveyance line along which the object to be tested is conveyed, and the object to be tested is photographed as the object to be photographed.

The display 13a is an output device for displaying a camera image obtained by photographing the object to be tested and an image processing result based upon the camera image. This display 13a is display-controlled by the image processing controller 11, and typically arranged in proximity to the image processing controller 11. That is, the display 13a is a display device for allowing a user to check an operating state of the image processing controller 11 in a case of the image processing controller 11 being in operation. The operational unit 13b is an input device for shifting a focus position and selecting a menu item on the display 13a.

The image processing controller 11 is a body unit of the image processing apparatus 1 which captures a camera image from the camera 12 and outputs, as a processing result a determination signal indicating a determination result based upon the camera image. The camera image acquiring operation is performed, for example, based upon an image pick-up unit trigger signal which is a control signal inputted from external equipment such as a PLC and defines timing for capturing a camera image.

This image processing controller 11 is connected with four cameras 12 at the maximum, and based upon camera images obtained from these cameras 12, image processing is performed. A determination signal outputted from the image processing controller 11 is generated as a signal indicating a determination result about the quality of a product, or the like.

Further, this image processing controller 11 is connected with the display 13a and the operational unit 13b, and even not connected with the PC 2, the image processing controller 11 is capable of making the display 13a and the operational unit 13b operate respectively as the output device and the input device.

The PC 2 is a program creation apparatus which creates a control program for the image processing controller 11, and generates a control program by means of an editor (software) operated on the PC 2. At the time of creating the control program for the image processing controller 11, the program can be simulated on the PC 2 for checking its operation.

In the PC 2, layout information for definition of a display mode on the display 13a by the image processing controller 11 is created. This layout information is also created on the edition screen in the PC 2 by means of the editor, and test setting data including the control program and the layout information is generated.

The PC 2 and the image processing controller 11 of the image processing apparatus 1 are connected with each other through a communication network such as Ethernet (registered trademark) or the like. The PC 2 is detachably connected with a plurality of image processing controllers 11. The test setting data created on the PC 2 is transferred to the image processing controller 11 so that the test setting data inside the image processing controller 11 can be rewritten. Further, the test setting data inside the image processing controller 11 can be captured and edited on the PC 2. This PC 2 is typically connected with the image processing controller 11 in maintenance of the image processing apparatus 1.

In this test support system, a camera image acquired from the camera 12 during operation of the image processing controller 11 and a measurement result extracted from the camera image are stored as history information, and can be displayed on the display 13a or the PC 2 according to need.

<System Configuration>

Figure 2:
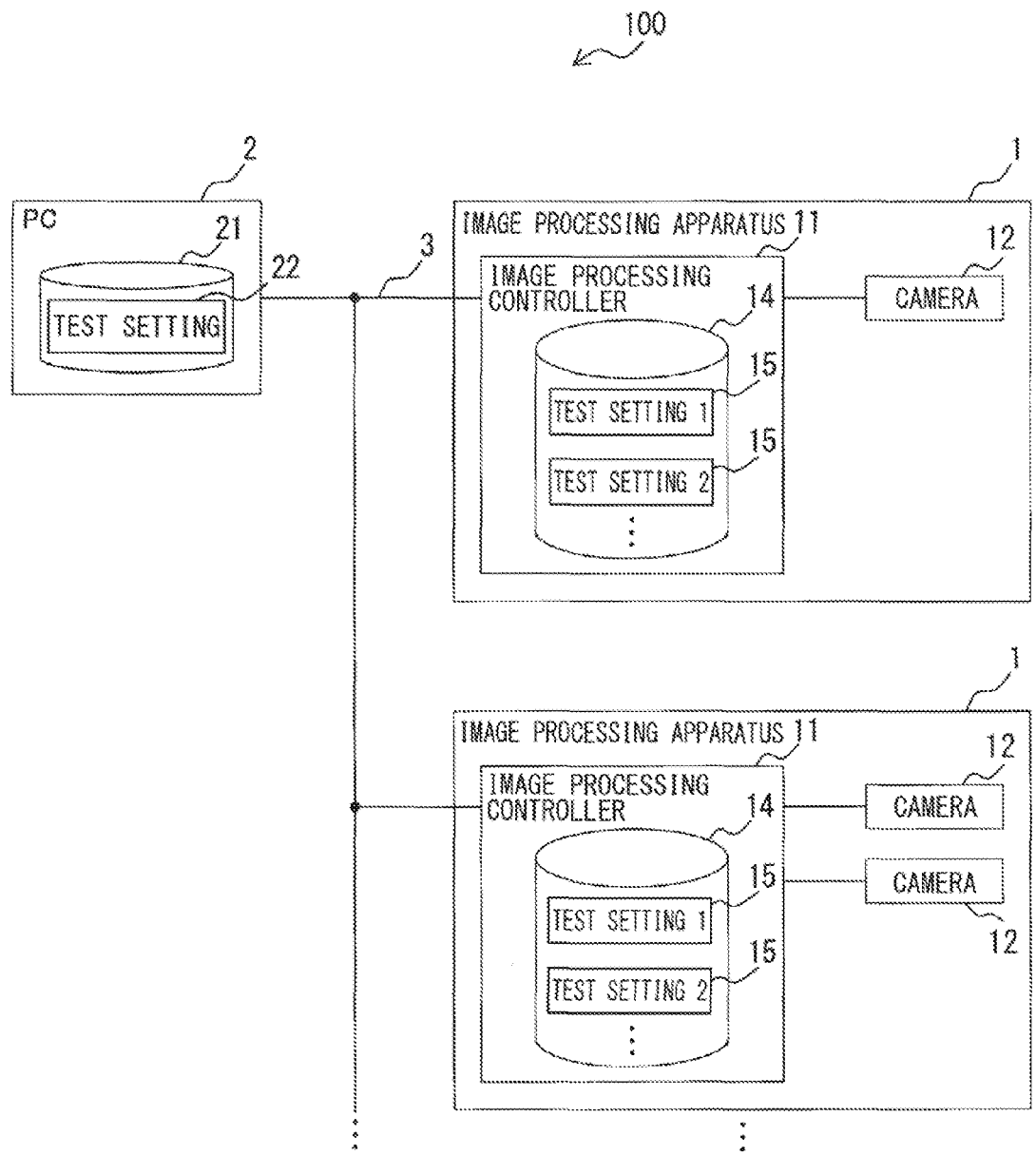
FIG. 2 is a block diagram showing an example of a system configuration of the test support system of FIG. 1.

FIG. 2 is a block diagram showing an example of a system configuration of the test support system of FIG. 1. This test support system 100 is configured by one PC 2 and a plurality of image processing apparatuses 1 connected to the PC 2 through a communication network 3. The control program created on the PC 2 is stored into a memory 21 as test setting data 22.

The test setting data 22 created on the PC 2 is transferred to the image processing controller 11 through the communication network 3. At this time, specifying a transfer destination and transferring the test setting data 22 can update test setting data 15 inside a memory 14 or add new test setting data inside the memory 14 in a desired image processing controller 11.

In this image processing controller 11, a plurality of test setting data 15 are held inside the memory 14 such as a flash memory. Each test setting data 15 includes control programs with different processing procedures or test contents, and the test setting data 15 as an object to be executed can be changed based upon a user's operation.

In the PC 2, an operation is performed to obtain the test setting data 15 from the image processing controller 11 connected through the communication network 3, and edit the obtained data.

<Editor Screen>

Figure 3:
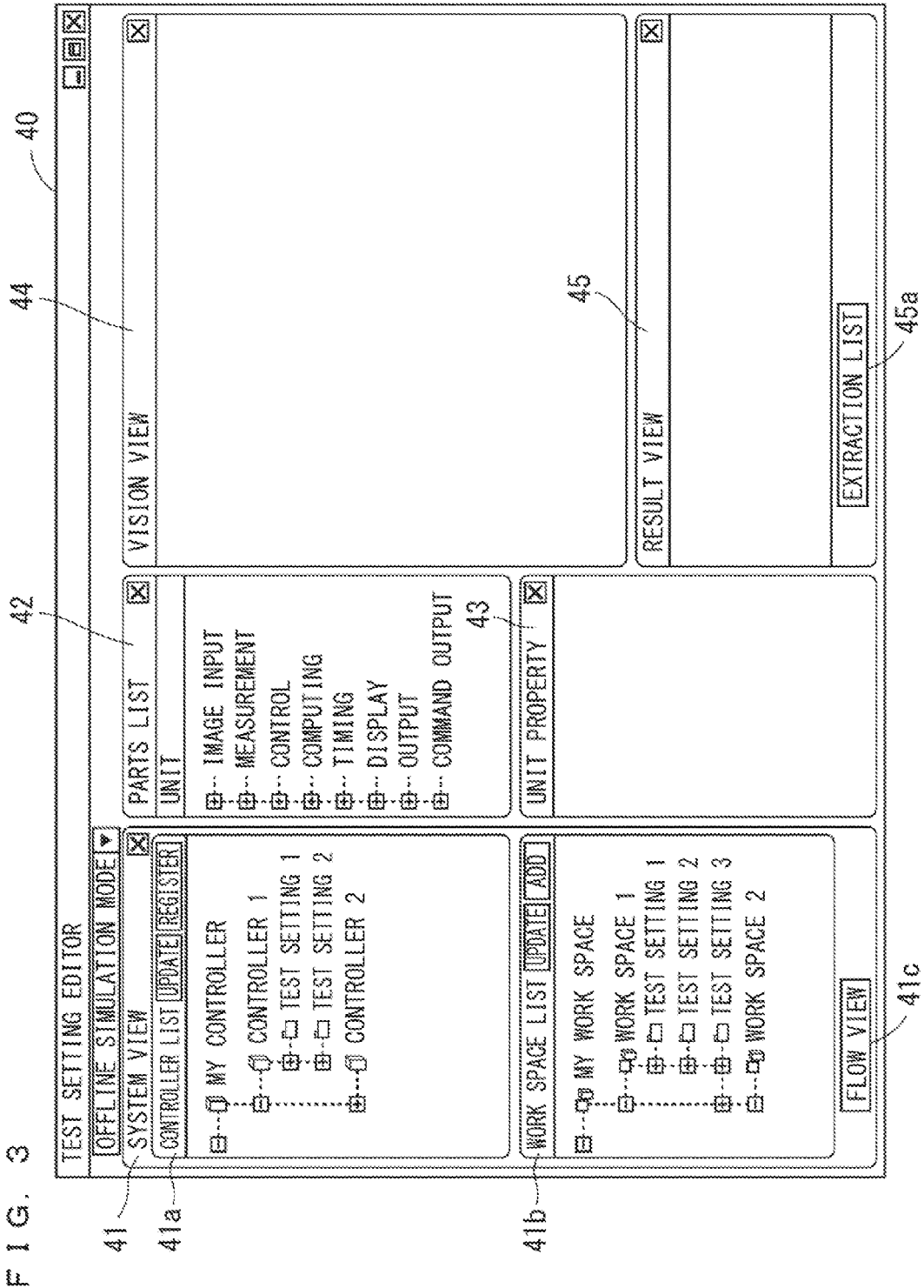
FIG. 3 is a view showing an example of an operation of a PC 2 in a test support system 100 of FIG. 2, showing an editor screen 40 for creating test setting data 22.

FIG. 3 is a view showing an example of an operation of the PC 2 in the test support system 100 of FIG. 2, and shows an editor screen 40 for creating the test setting data 22. The editor screen 40 is an edition screen for newly creating test setting data on the PC 2, or editing test setting data obtained from the image processing controller 11, and the editor screen 40 is displayed on the PC 2.

This editor screen 40 includes a plurality of screens, whose display positions and display ranges are changeable respectively. Specifically, the editor screen 40 includes a system view window 41, a parts-list window 42, a unit property window 43, a vision view window 44, and a result view window 45.

The system view window 41 is a window screen for list-displaying system configurations and test setting data as objects to be edited, and includes a controller list screen 41a and a work space list screen 41b.

The controller list screen 41a is a screen for list-displaying the image processing controllers 11 connected to the PC 2, and displays icons indicating the image processing controllers 11 and icons indicating the test setting data 15 held inside the image processing controllers 11.

The respective icons indicating the image processing controllers 11 and the test setting data 15 are displayed in tree form. Namely, the icons are displayed with the image processing controller 11 taken as an upper hierarchical layer and the test setting data 15 held inside the image processing controller 11 taken as a lower hierarchical layer, such that which image processing controller 11 holds each test setting data 15 is identifiable.

The work space list screen 41b is a screen for list-displaying test setting data as an object to be edited, and displays an icon indicating an operational region on the memory 21 provided in each image processing controller 1, and an icon indicating the test setting data. The operational region on the memory 21 is associated with the corresponding image processing controller 11, and is displayed as a work space. That is, the test setting data is held in each image processing controller 11, and edition is performed in the work space in each image processing controller 11.

The icons respectively indicating operational regions and the test setting data as thus described are displayed in tree form. Namely, the icons are displayed with the work space corresponding to the image processing controller 11 taken as an upper hierarchical layer and the test setting data inside this work space taken as a lower hierarchical layer, such that in which work space each test setting data is present is identifiable.

When an update button (icon) arranged in a heading area of the controller list screen 41a is operated, test setting data is newly obtained from the image processing controller 11, and the test setting data and the system configuration held on the PC 2 are updated to new ones. Further, when a registration button is operated, the test setting data created on the PC 2 is transferred to the image processing controller 11.

When an update button (icon) arranged in a heading area of the work space list screen 41b is operated, test setting data as an object to be edited is updated by test setting data obtained from the image processing controller 11. Further, when an addition button is operated, a new operational region is provided, and an icon indicating test setting data is added.

The parts-list window 42 is a window screen for displaying, as a unit list, processing units selectable at the time of creating test setting data. The processing unit is a symbol showing processing in which a parameter is changeable. As the processing units, provided are an image processing unit showing image processing, an image pick-up unit showing image pick-up processing, a control unit showing flow control processing, an output unit showing output processing, and the like. Arranging such a processing unit on a flowchart inside a later-described flow view window can create a control program including a desired flow sequence.

A plurality of processing units are displayed inside the parts-list window 42. In this example, the processing units are segmented into eight categories depending upon kinds of processing, and icons indicating the respective categories are displayed. Specifically, the processing units are segmented into categories of "image input", "measurement", "control", "computing", "timing", "display", "output", and "command output".

"Image input" is a category to which a processing unit concerning image pick-up belongs, and an image pick-up unit that captures a camera image belongs to this category. The image pick-up unit is a processing unit that acquires a camera image for image processing based upon an image pick-up trigger signal. As the image pick-up trigger signal, an input signal that is inputted from the external equipment such as the PLC through an image pick-up trigger input terminal and an internal trigger signal that is generated inside the image processing controller 11 can be used. Such an image pick-up unit is associated with parameters for specifying a shutter speed, camera sensitivity, flash delay time, flash-on time, a camera as an object for image pick-up, a flash terminal, and a trigger terminal, as properties.

"Measurement" is a category to which a processing unit concerning measurement belongs, and a measurement unit that extracts a measurement result from a camera image acquired by the image pick-up unit and determines the quality of an object to be tested based upon this measurement result belongs to this category. A pattern search unit, an edge position detection unit, a blob detection unit, and a color test unit belong to such a measurement unit.

Pattern search is processing for scanning the inside of a search region on a camera image, to detect a position consistent with a previously registered pattern image. Edge position detection is processing for obtaining an average concentration in a direction vertical to a detection direction in a measurement region on the camera image, to detect a position of an edge from a change in concentration in the detection direction.

Blob detection is processing for binarizing a camera image and extracting a lump of pixels having the same concentration as blobs, to detect the number, an area and a barycentric position of blobs present inside the measurement region. A color test is processing for measuring a color inside a test region, and a numerical value corresponding to the color is extracted as a measurement result.

In the image processing concerning the measurement as thus described, a shape and a size of the object to be tested, a position of the object to be tested inside a camera image, and the like is detected, and the measurement value is outputted as an image processing result. Further, the measurement value is compared with a parameter previously specified by the user, and based upon this comparison result, the quality of the object to be tested, such as presence or absence of deficiency or abnormality, is determined and the determination result is outputted as an image processing result. Further, a camera image, embedded with a symbol graphically indicating a measurement region, a detected position of the object to be tested, and the like, is created and outputted as an image processing result.

"Control" is a category to which a processing unit concerning control belongs, and control units such as a repeat unit, a bypass unit, and an end symbol unit belong to this category. The repeat unit is a processing unit including a repeat start unit that shows a start point for the time of repetition of an execution flow, and a repeat end unit that shows an end point for the same, and the unit shows processing for repeating the execution flow between the start unit and the end unit until a prescribed condition is satisfied.

The bypass unit is a processing unit including a branching unit that branches the execution flow into two or more branch flows and a converging flow that converges the branch flows branched by the branching unit, and the unit shows processing for branching the execution flow under a prescribed condition. The end symbol is a display object for completing one flow sequence.

"Computing" is a category to which a processing unit concerning computing belongs, and image processing units such as a numerical value computing unit and a position correction unit belong to this category. "Timing" is a category to which a processing unit concerning flow-shift timing control belongs, and control units such as a timer wait unit and an event wait unit belong to this category The timer wait unit is a wait unit showing processing for stopping flow shift just for a prescribed period of time. The event wait unit is a wait unit showing processing for stopping flow shift until a terminal input or a variable value comes into a prescribed condition.

"Display" is a category to which a processing unit concerning display belongs, and an image processing unit such as a graphic display belongs to this category. The graphic display unit shows processing for referencing another processing unit and graphically displaying a processing result of the referenced processing unit.

"Output" is a category to which a processing unit concerning output belongs, and output units such as a terminal output unit, a result output unit and an image output unit belong to this category. The terminal output unit is associated with parameters for specifying a reference destination unit, a determination result, and an output destination terminal for a determination result, as properties. The result output unit is associated with parameters for specifying a reference destination unit, numerical value data showing a processing result, a data form (text form or binary form) when outputting numerical value data, and an output destination for numerical value data, as properties. The image output unit is associated with parameters for specifying a reference destination unit, a camera image, a data form when outputting image data, and an output destination for image data, as properties.

"Command output" is a category to which a processing unit concerning display belongs, and output units such as a command issue unit, a display pattern switch unit and a dialog display unit belong to this category. The command issue unit shows processing for issuing a command such as registering of an image, switching of a test setting, or resetting.

The unit property window 43 is a window screen for displaying a property of a processing unit selected on the controller list screen 41a, the work space list screen 41b or the flow view window.

The vision view window 44 is a window screen for displaying a camera image associated with the processing unit selected on the controller list screen 41a, the work space list screen 41b or the flow view window.

The result view window 45 is a window screen for displaying a parameter of the processing unit selected on the controller list screen 41a, the work space list screen 41b or the flow view window, and a simulation result.

On this editor screen 40, when a flow view button 41c arranged in a lower portion of the system view window 41 is operated, the flow view window can be displayed in place of the foregoing system view window 41. The flow view window is a window screen that displays as a flowchart a processing procedure to be executed by the image processing controller 11, and displays test setting data selected on the work space list screen 41b.

Further, when an extraction list button 45a arranged in the lower portion of the result view window 45 is operated, an extraction list window can be displayed in place of the result view window 45. The extraction list window is a window screen for extracting a parameter selected on the result view window 45 and a processing result and list-displaying an extraction result per each processing unit.

<Flow View Window>

Figure 4:
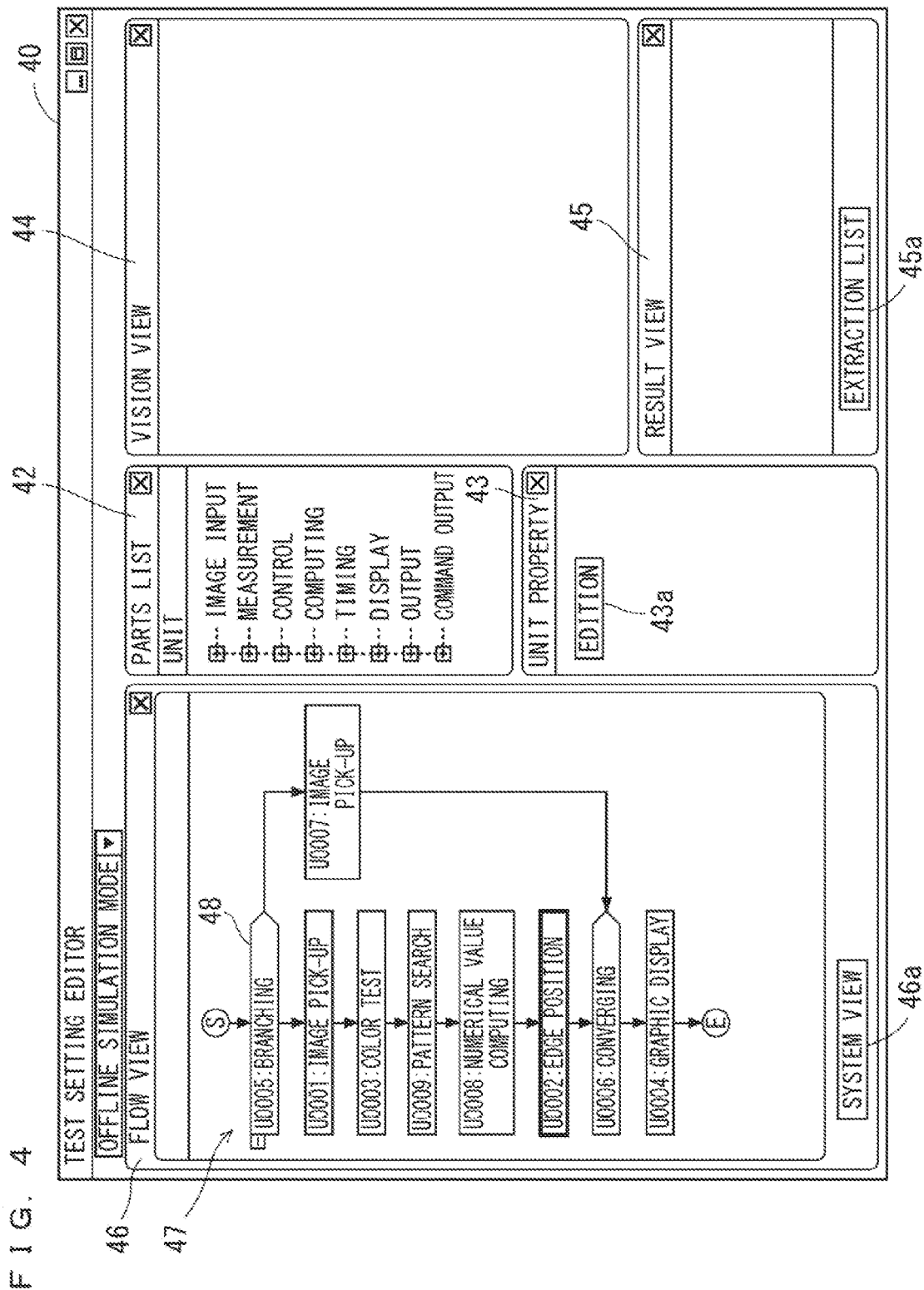
FIG. 4 is a view showing an example of the operation of the PC 2 in the test support system 100 of FIG. 2, showing the editor screen 40 where a flow view window 46 is displayed.

FIG. 4 is a view showing an example of the operation of the PC 2 in the test support system 100 of FIG. 2, and shows the editor screen 40 where a flow view window 46 is displayed. The flow view window 46 is a window screen that displays a flowchart 47 showing a processing procedure in order to newly create a control program of test setting data or edit a control program obtained from the image processing controller 11.

On the flow view window 46, a flowchart 47 configured by arraying a plurality of processing units 48 is displayed. In the flowchart 47 represented is a processing unit executed in a time-series manner on an execution flow that is started with a start symbol "S" and completed with an end symbol "E". The user can arrange the processing unit 48 on such an execution flow so as to configure a desired control program.

That is, a series of image processing to be performed by the image processing controller 11 is blocked as a processing unit, and the user can only arrange a processing unit on the execution flow inside the flow view window 46 so as to create a flow sequence in which the processing unit performs prescribed processing based upon a processing result of a processing unit immediately before this processing unit.

When a system view button 46a arranged in the lower portion of the flow view window 46 is operated, the system view window 41 can be displayed in place of the flow view window 46.

The processing unit being selected on the flow view window 46 is focus-displayed, and its property is displayed inside the unit property window 43. An edition button 43a is arranged inside the unit property window 43, and when the edition button 43a is operated, a property edition screen for editing a property of a processing unit is displayed. The property edition screen is an edition screen for specifying a parameter of a processing unit based upon a user operation or changing an already specified parameter.

<Flowchart>

Figure 5:
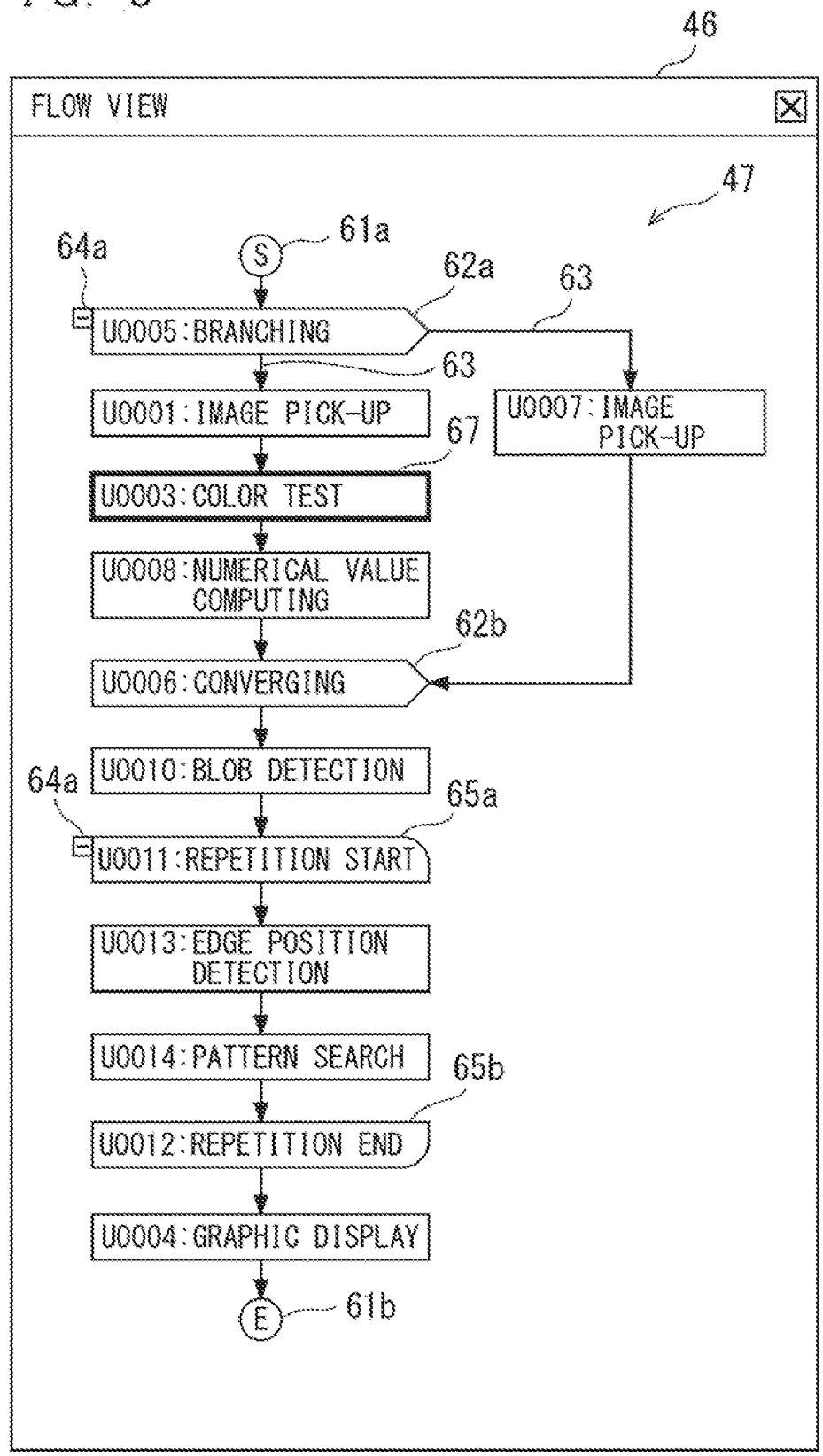
FIG. 5 is a view showing an example of the operation of the PC 2 in the test support system 100 of FIG. 2, showing an example of a flowchart 47 inside the flow view window 46.

FIG. 5 is a view showing an example of the operation of the PC 2 in the test support system 100 of FIG. 2, and shows an example of a flowchart 47 inside the flow view window 46. In this flowchart 47, a plurality of processing units are arranged on an execution flow that is started with a start symbol 61a and completed with an end symbol 61b.

In a case of creating and editing the flowchart 47 on the flow view window 46, an operation is performed using the parts-list window 42. For example, in a case of inserting a processing unit into the flowchart 47, a desired processing unit is selected on the parts-list window 42, and a position for the selected unit on the execution flow is specified by the mouse pointer or the like, so that the processing unit is inserted.

In this example, the flowchart 47 is configured by arranging a branching unit 62a, an image pick-up unit, a color test unit, a numerical value computing unit, a converging unit 62b, a blob detection unit, a repeat start unit 65a, an edge position detection unit, a pattern search unit, a repeat end unit 65b, and a graphic display unit in this order, on the execution flow.

The branching unit 62a and the converging unit 62b are control units constituting a bypass unit, and when the bypass unit is inserted onto the execution flow, the branching unit 62a and the converging unit 62b are always inserted in pair. In the branching unit 62a, processing is performed for alternatively selecting a branch flow after the branching based upon a measurement result and a determination result of a processing unit immediately before the branching unit 62a. A condition of which branch flow after the branching is to be selected is specified by the user as a parameter of the branching unit 62a.

In this example, the execution flow from the start symbol 61a is branched by the branching unit 62a into two branch flows 63, and the branch flows branched in this branching unit 62a is converged in the converging unit 62b. At that time, the one branch flow 63 reaches the converging unit 62b through the image pick-up unit, the color test unit and the numerical value computing unit, whereas the other branch flow 63 is a bypass channel (diversion) that reaches the converging unit 62b through the image pick-up unit.

The repeat start unit 65a and the repeat end unit 65b are control units constituting a repeat unit, and when the repeat unit is inserted onto the execution flow, the repeat start unit 65a and the repeat end unit 65b are inserted in a pair.

In this example, the edge-position detection unit and the pattern search unit are arranged between the repeat start unit 65a and the repeat end unit 65b, and at the time of execution, the processing of the edge-position detection unit and the pattern search unit are repeated.

A folding icon 64a is arranged on the branching unit 62a and a repeat start unit 65a inside the flowchart 47. This folding icon 64a is an icon for displaying the flowchart 47 with the execution flow between the control units omitted, and is displayed adjacently to the processing unit.

Further, a processing unit selected on the flowchart 47 is focus-displayed, and can make a property of the processing unit displayed inside the unit property window 43, or change a property of the processing unit as an object to be edited.

<Functional Configuration of Editor>

Figure 6:
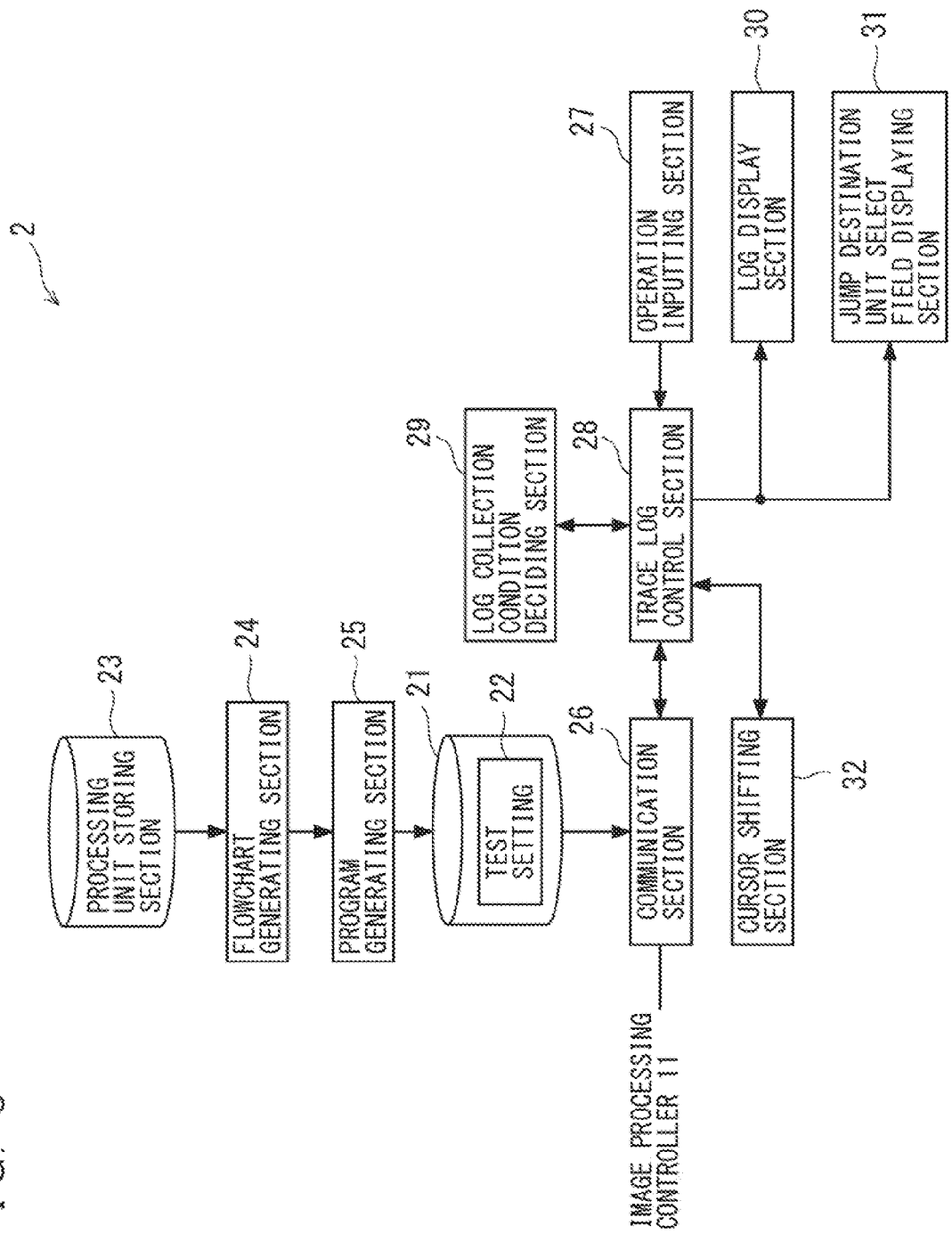
FIG. 6 is a block diagram showing a configurational example of the PC 2 in the test support system 100 of FIG. 2, showing an example of a functional configuration of an editor.

FIG. 6 is a block diagram showing a configurational example of the PC 2 in the test support system 100 of FIG. 2, and shows an example of a functional configuration of an editor that creates a control program for the image processing controller 11. This PC 2 includes the memory 21, a processing unit storing section 23, a flowchart generating section 24, a program generating section 25, a communication section 26, an operation inputting section 27, a trace log control section 28, a log collection condition deciding section 29, a log display section 30, a jump destination unit select field displaying section 31, and a cursor shifting section 32.

The processing unit storing section 23 holds processing units such as an image pick-up unit and a measurement unit. The flowchart generating section 24 performs an operation of arranging a processing unit on an execution flow that is started with a start symbol and completed with an end symbol, to generate the flowchart 47.

The program generating section 25 performs an operation of converting the flowchart 47 created by the user on the flow view window 46 into an execution form, to generate a control program for the image processing controller 11.

The memory 21 holds the control program generated by the program generating section 25, as the test setting data 22. The communication section 26 performs an operation of transferring the test setting data 22 inside the memory 21 to the image processing controller 11. The operation inputting section 27 performs an operation of operational keys on a keyboard, or an operation of outputting a prescribed input signal based upon an operation of a pointing device such as a mouse.

The trace log control section 28 performs an operation of making the image processing controller 11 collect an execution log, and reads the collected execution log from the image processing controller 11. The execution log is data showing a terminal state in time series at the time of executing a control program. In the image processing controller 11, a signal state of a signal inputted or outputted from or to the external equipment through an input terminal or an output terminal is sampled as the execution log. For example, by transmitting a log collection starting command to the image processing controller 11 through the communication section 26, the sampling of the terminal state is started and held as a trace log.

It is assumed here that a "mode without a trigger" and an "event trigger mode" are provided as log collecting methods, and are selectable. The "mode without a trigger" is a method for directing the image processing controller 11 to start or complete collection of an execution log so as to collect an execution log. On the other hand, the "event trigger mode" is a method for directing the image processing controller 11 only to start collection so as to automatically complete collection of an execution log in a case of establishment of a prescribed condition (hereinafter referred to as a trigger condition).

The log collection condition deciding section 29 performs an operation of deciding a collection condition when the image processing controller 11 collects an execution log. Specifically, an object to be collected for an execution log, a log collecting method, a trigger condition or the like is decided as the collection condition.

The log display section 30 performs an operation of displaying on the editor screen 40 an execution log acquired by the trace log control section 28 from the image processing controller 11 through the communication section 26. The execution log is, for example, displayed inside the log view window on the editor screen 40 correspondingly to a time scale.

The jump destination unit select field displaying section 31 performs an operation of displaying inside the log view window a select field for selecting a processing unit as a cursor shifting destination. The cursor shifting section 32 performs processing for making the cursor jump on the execution log to a place of a processing unit selected in this select field. This cursor is a display object showing a position selected on the execution log, and for example, displayed as a select line.

<Trace Log Condition Setting Screen>

Figure 7:
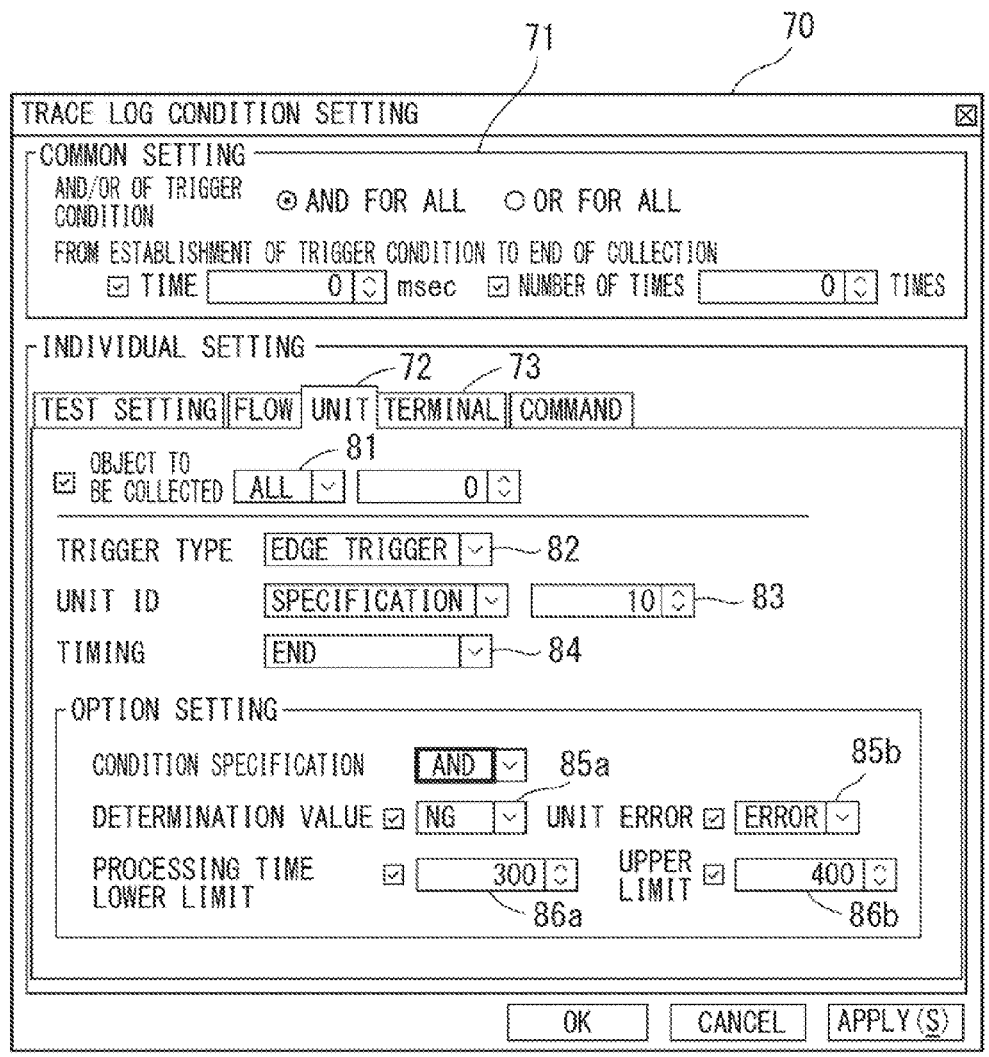
FIG. 7 is a view showing an example of the operation of the PC 2 in the test support system 100 of FIG. 2, showing a log condition setting screen 70 for setting a collection condition of a trace log.

FIG. 7 is a view showing an example of the operation of the PC 2 in the test support system 100 of FIG. 2, showing a log condition setting screen 70 for setting a collection condition of a trace log. The log condition setting screen 70 is a window screen for specifying a collection condition at the time of the image processing controller 11 collecting an execution log, and displayed on the editor screen 40.

This log condition setting screen 70 is provided with an input field 71 concerning common setting and an input field concerning individual setting. The input field 71 is provided with a select field for a trigger condition specifying method, and a select field for a log collection completing method after establishment of a trigger condition.

In the select field for the trigger condition specifying method, it is possible to select which, a logic product of a plurality of conditions or a logic addition thereof, is to be selected as a trigger condition. In a case of selecting the logic product as the trigger condition, the trigger condition is established when all of the plurality of conditions are established.

On the other hand, in a case of selecting the logic addition, the trigger condition is established when any of the plurality of conditions is established.

In the select field for the log collection completing method after establishment of the trigger condition, the time or the number of measurements from establishment of the trigger condition until completion of log collection can be specified.

The input field concerning individual setting is provided with a unit setting tab 72 and a terminal setting tab 73, and by operation of these tabs, either a setting field for a processing unit or a setting field for an input/output terminal can be selectively displayed. In this figure, a case is shown where the setting field for a processing unit has been selected by operation of the unit setting tab 72.

The processing unit setting field is provided with an select field 81 for selecting an object to be collected for an execution log, an input field 82 for a type of trigger, an input field 83 for specifying a processing unit, a select field 84 for timing, and the input field concerning option setting.

The select field 82 for the type of trigger is an input field for specifying a log collecting method, where any of a "mode without a trigger", an "edge trigger mode" or a "level trigger mode" can be selected.

The "edge trigger mode" is an event trigger mode that completes log collection in sync with an input signal from an input terminal previously specified as an edge trigger input terminal, or processing start or processing end of a processing unit. The "level trigger mode" is an event trigger mode that completes log collection based upon two event trigger signals, where log collection is stopped in accordance with a state change of an input terminal previously specified as an input terminal of an event trigger signal. Specifically, a logic product of two event trigger signals is referenced, and when one trigger signal is in an on-state, log collection is completed in sync with shift of the mode of another trigger signal to the on-state. That is, when both of the two trigger signals come into the on-state (e.g. the signals come into a high-level state), log collection is completed.

The input field 83 is an input field for specifying a processing unit as an object for a trigger condition at the time of selecting the event trigger mode, where either "all" or "specification" can be selected. The select field 84 for timing is an input field for selecting the timing for completing log collection in sync with processing of the processing unit in a case where the edge trigger mode has been selected and further, the processing unit has been specified in the input field 83, where processing start and processing end, or either the start or the end can be selected.

The input field concerning option setting is an input field for additionally specifying a trigger condition, and is provided with a select field 85a for a determination value, a select field 85b for a unit error, an input field 86a for a lower limit of processing time, and an input field 86b for an upper limit thereof.

The select field 85a for a determination value is an input field for specifying a determination result of the quality of an object to be tested in a processing unit as a trigger condition, where either "OK" or "NG" can be selected.

The select field 85b for a unit error is a input field for specifying a unit error in a measurement unit as a trigger condition. The unit error is overflow of a measurement value or parameter setting error, and generation of such an error is a trigger condition.

The input fields 86a and 86b for processing time are input fields for specifying the time from processing start to the processing end of a processing unit as a trigger condition, and when the time exceeds the range specified in the input fields 86a and 86b, the trigger condition is considered as established.

Figure 8:
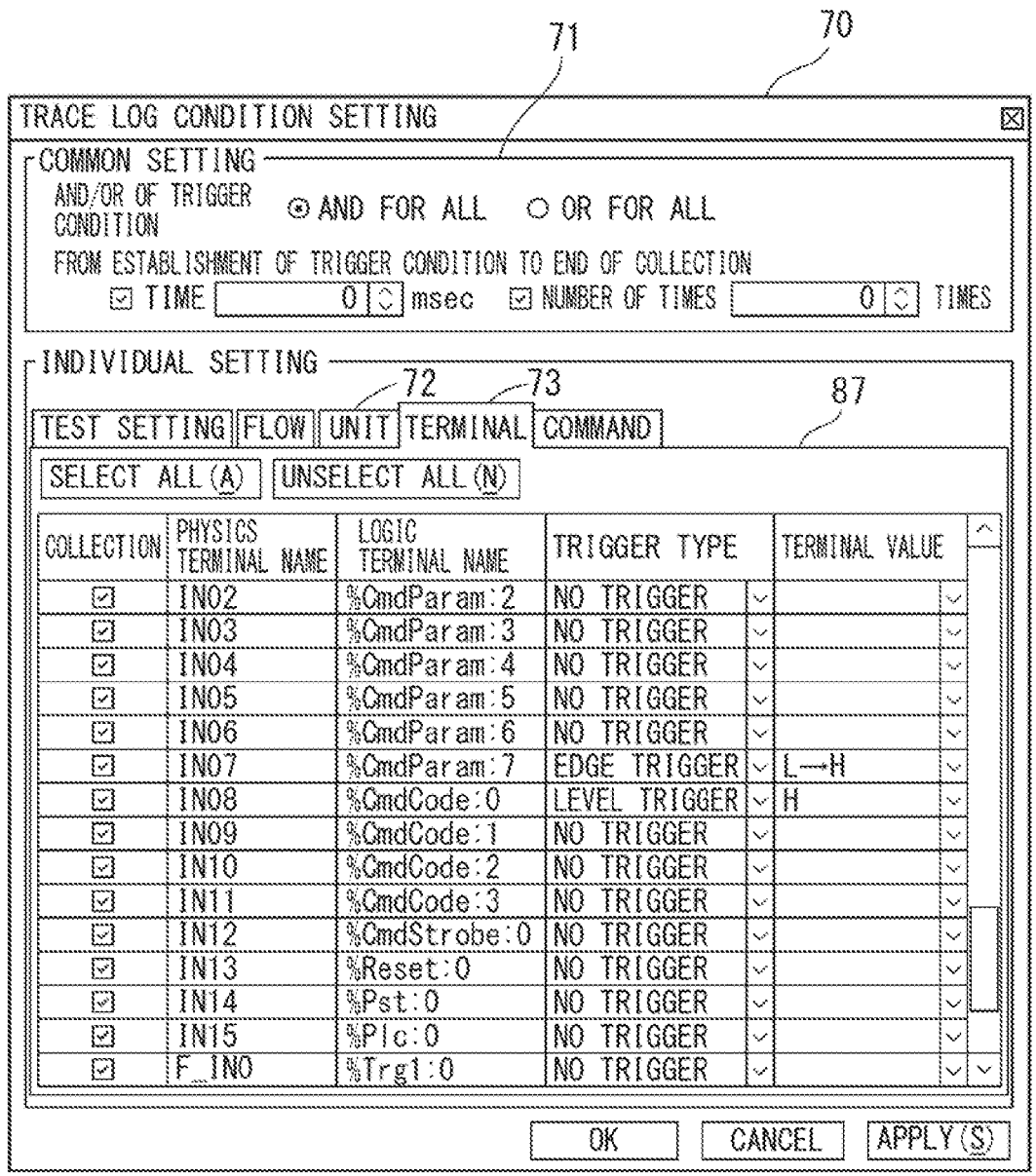
FIG. 8 is a view showing an example of the operation of the PC 2 in the test support system 100 of FIG. 2, showing a case where a setting field for an input/output terminal has been selected.

FIG. 8 is a view showing an example of the operation of the PC 2 in the test support system 100 of FIG. 2, and shows a case where a setting field for an input/output terminal has been selected by operation of the terminal setting tab 73. In this setting field for an input/output terminal, input terminals and output terminals selectable as objects to be collected as an execution log are list-displayed.

In each terminal, attribute information such as a physical terminal name, a logic terminal name, the type of trigger, and a terminal value are displayed. As the type of trigger, whether or not the terminal has been specified as an input terminal of an edge trigger or a level trigger is shown. As the terminal value, a terminal state or a state change of the terminal as a trigger condition is shown.

<Collection of Execution Log>

Figure 9:
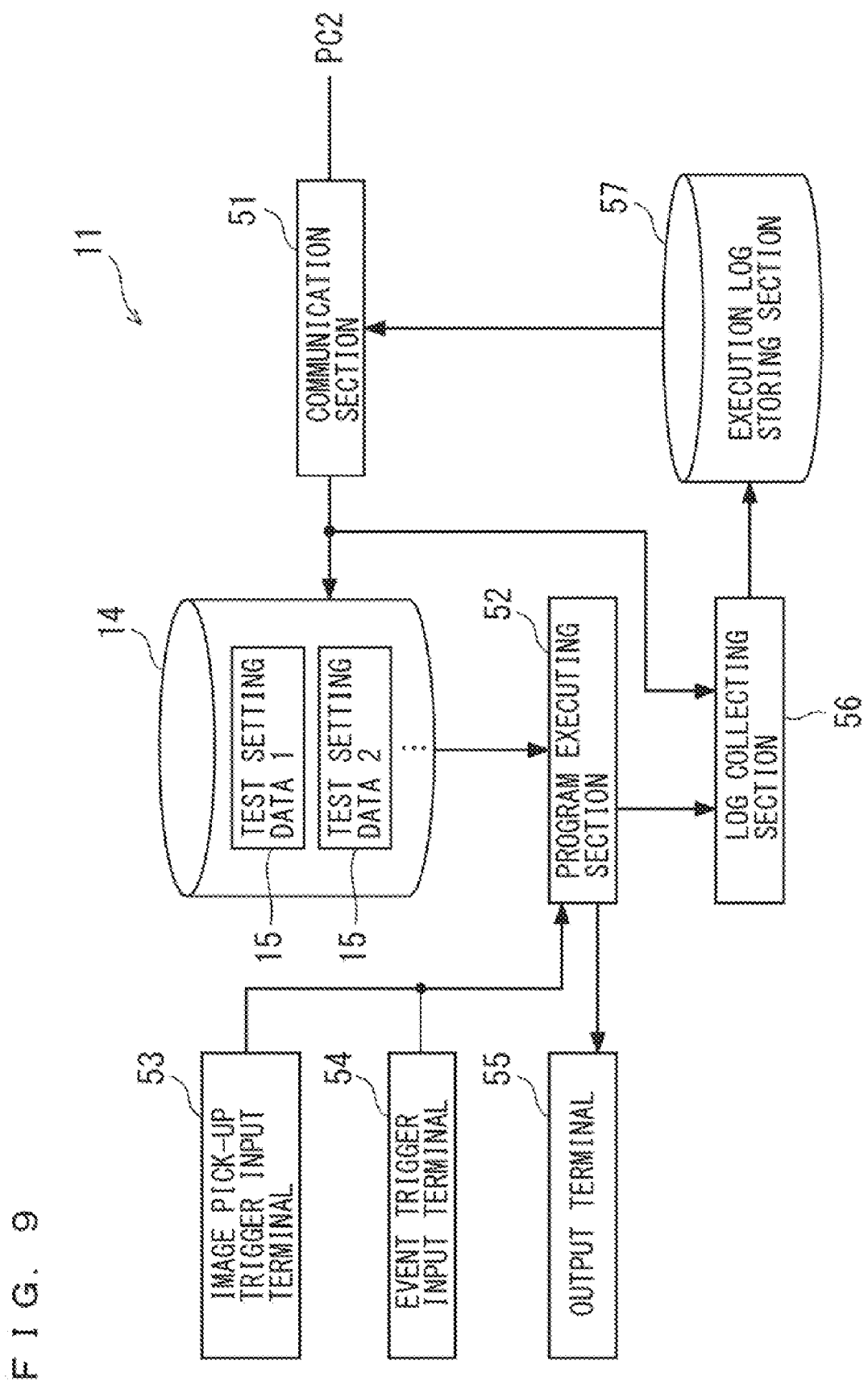
FIG. 9 is a block diagram showing a configurational example of the image processing controller 11 in the test support system 100 of FIG. 2.

FIG. 9 is a block diagram showing a configurational example of the image processing controller 11 in the test support system 100 of FIG. 2. This image processing controller 11 is configured by the memory 14, a communication section 51, a program executing section 52, an image pick-up trigger input terminal 53, an event trigger input terminal 54, an output terminal 55, a log collecting section 56, and a execution log storing section 57. The memory 14 is a storing part for a control program that holds test setting data 15 transferred from the PC 2.

The program executing section 52 is a processing section that reads and executes a control program held inside the memory 14 as the test setting data 15, to perform a series of image processing In this program executing section 52, a control program is repeatedly executed with an acquirement cycle in acquiring a camera image taken as a measurement cycle.

A cycle (measurement cycle) in repeatedly executing a control program is defined by the flowchart 47 corresponding to the control program. Namely, a measurement cycle is set with a flow sequence from a start symbol (unit) to an end symbol on the flowchart 47 taken as image processing equivalent to one cycle. Therefore, when one image pick-up unit is arranged on the flowchart 47, every time one camera image as an object to be measured is acquired, one measurement is performed based upon the camera image, and a measurement result is extracted from the camera image.

At the time of executing an image pick-up unit, processing for acquiring a camera image from the camera 12 based upon an input signal from the image pick-up trigger input terminal 53 is performed.

In a case where a plurality of test setting data 15 are held inside the memory 14, image processing is performed based upon test setting data selected and specified by the user as an object to be executed.

The log collecting section 56 performs an operation of sampling a terminal state of an input terminal, such as the image pick-up trigger input terminal 53 or the event trigger input terminal 54, or the output terminal 55 at the time of executing a control program, to hold a sampling result as an execution log showing a terminal state in time series. Specifically, interruption processing is generated by a change in terminal state, and by this interruption processing, the execution log is captured. Such log collection is started based upon a log collection start command from the PC 2, and the collected execution log is stored inside the execution log storing section 57 in association with a processing unit.

The execution log extracted by the log collecting section 56 includes time information showing processing start and processing end of a processing unit, and determination result information with respect to each measurement unit which shows a determination result of the quality of the object to be tested. That is, the execution log includes the time required for processing with a processing unit on the flowchart 47 taken as a unit.

Further, in a case where a control program as an object for log collection includes the branching unit, the execution log includes branch destination information showing a destination of branching by the branching unit.

The log collection completing method differs depending upon which mode, the "mode without a trigger" or the "event trigger mode", has been selected as a collection condition of the execution log. Namely, in the mode without a trigger, log collection is completed based upon an end command from the PC 2.

In the event trigger mode, log collection is completed based upon an input signal from an input terminal specified as the event trigger input terminal 54. Specifically, in a case of the edge trigger mode, log collection is completed in sync with an input signal from the input terminal, or processing start or processing end of a processing unit. In a case of the level trigger mode, a logic product of input signals from two input terminals specified as the event trigger input terminals 54 is referenced, and when one input signal is in the on-state, log collection is completed in sync with transfer of the state of another input signal to the on-state.

Further, in a case where a determination value of a processing unit, a unit error or processing time has been specified as a trigger condition, log collection is completed based upon such a set value. Namely, log collection is completed in accordance with a determination result of the quality of the object to be tested in a measurement unit. Further, log collection is completed in accordance with whether or not the time from processing start to the processing end in a processing unit is within a prescribed range. Moreover, log collection is completed in accordance with whether or not overflow of a measurement value in a measurement unit or parameter setting error has been generated.

The communication section 51 performs an operation of transferring the execution log inside an execution log storing section 57 to the PC 2 based upon a transfer request from the PC 2.

<Log View Window>

FIGS. 10 and 11 are views each showing an example of the operation of the PC 2 in the test support system 100 of FIG. 2, and each shows a log view window 90 displayed on the editor screen 40. The log view window 90 is a window screen for displaying an execution log acquired from the image processing controller 11.

On this log view window 90, arranged are a collection start button 91, a collection end button 92, a display field 94 for an execution log, a select field 95 for a jump destination unit, a cursor shift button 96, a selection field 97 for a scale, and a display button 98 of a log condition setting screen.

The collection start button 91 is an operational icon for starting log collection. By operation of the collection start button 91, a start command is transmitted to the image processing controller 11, and log collection can be started. The collection end button 92 is an operational icon for reading an execution log form the image processing controller 11.

The display field 94 is a display field for displaying an execution log correspondingly to a time scale, where a time scale showing a time axis on a top stage is arranged, and terminal states 104 of an input terminal and an output terminal are displayed correspondingly to a processing unit 103, a flow (measurement cycle) 102, and a detection setting 101.

Specifically, as the types of log 93a, the detection setting 101, the flow 102, the processing unit 103, and the terminal state 104 are provided, and an execution log with respect to each type of log is list-displayed.

In the flow 102, when the flow sequence was started and when completed are displayed in association with the number of measurements. In the processing unit 103, when each processing unit constituting the flow sequence was started and when completed are displayed in association with identification information of the processing unit. In the terminal state 104, a signal state of a signal inputted or outputted through an input terminal or an output terminal is displayed with either of two values, Hi or Low.

The select field 95 for a jump destination unit is an input field for selecting a processing unit as a shift destination for a cursor 110. The cursor shift button 96 is an operational icon for making the cursor 110 jump, and by operation of the cursor shift button 96, the cursor 110 can be shifted to a place of a processing unit selected by the select field 95.

The cursor 110 is a display object showing a position selected on the execution log, and displayed as a select line. In a select value display field 93b, a flow on the cursor 110, a processing unit and a terminal state are displayed.

Figure 10A:
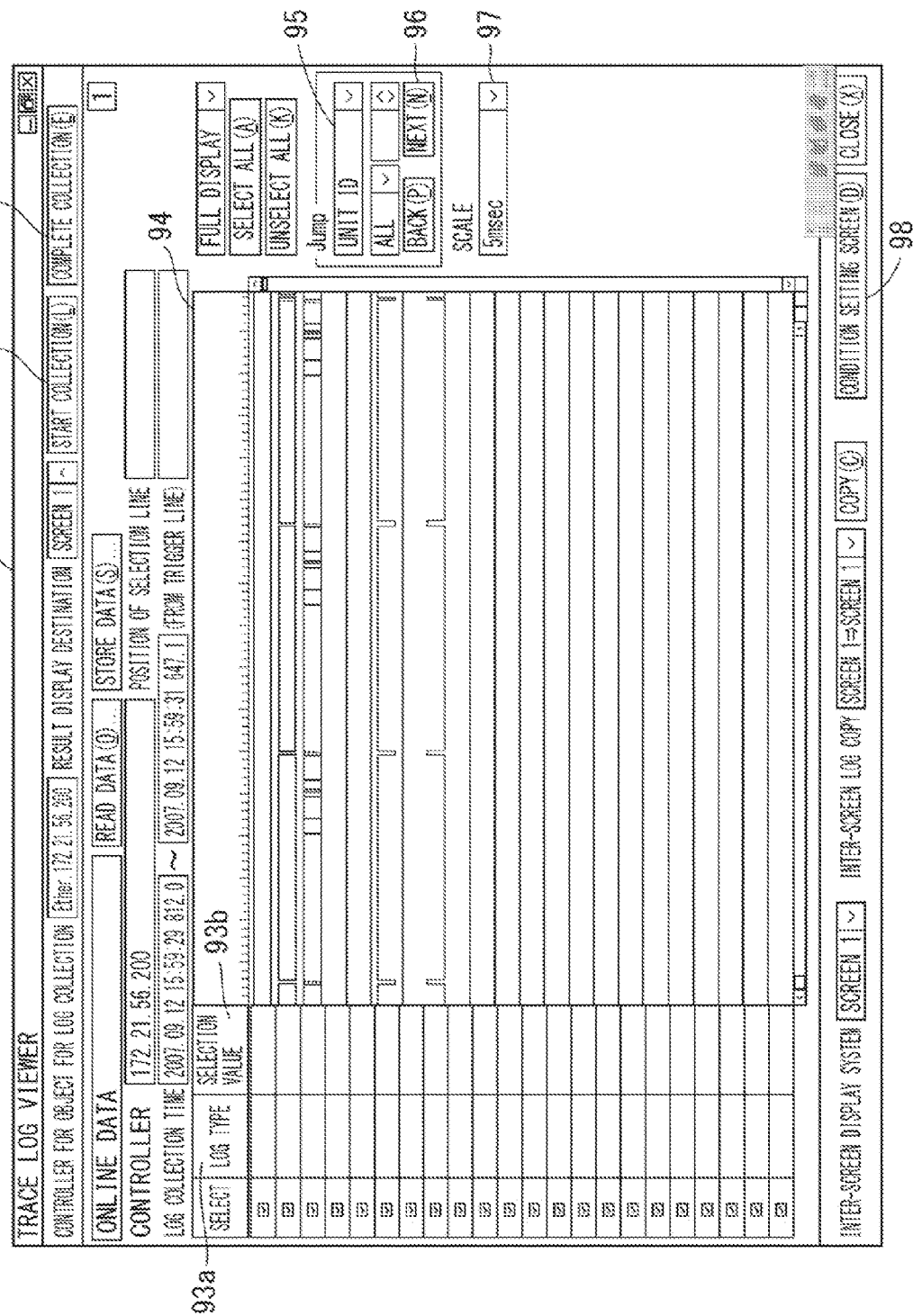
FIG. 10A is a view showing an example of the operation of the PC 2 in the test support system 100 of FIG. 2, showing a log view window 90 where 5 msec per scale has been selected.
Figure 10B:
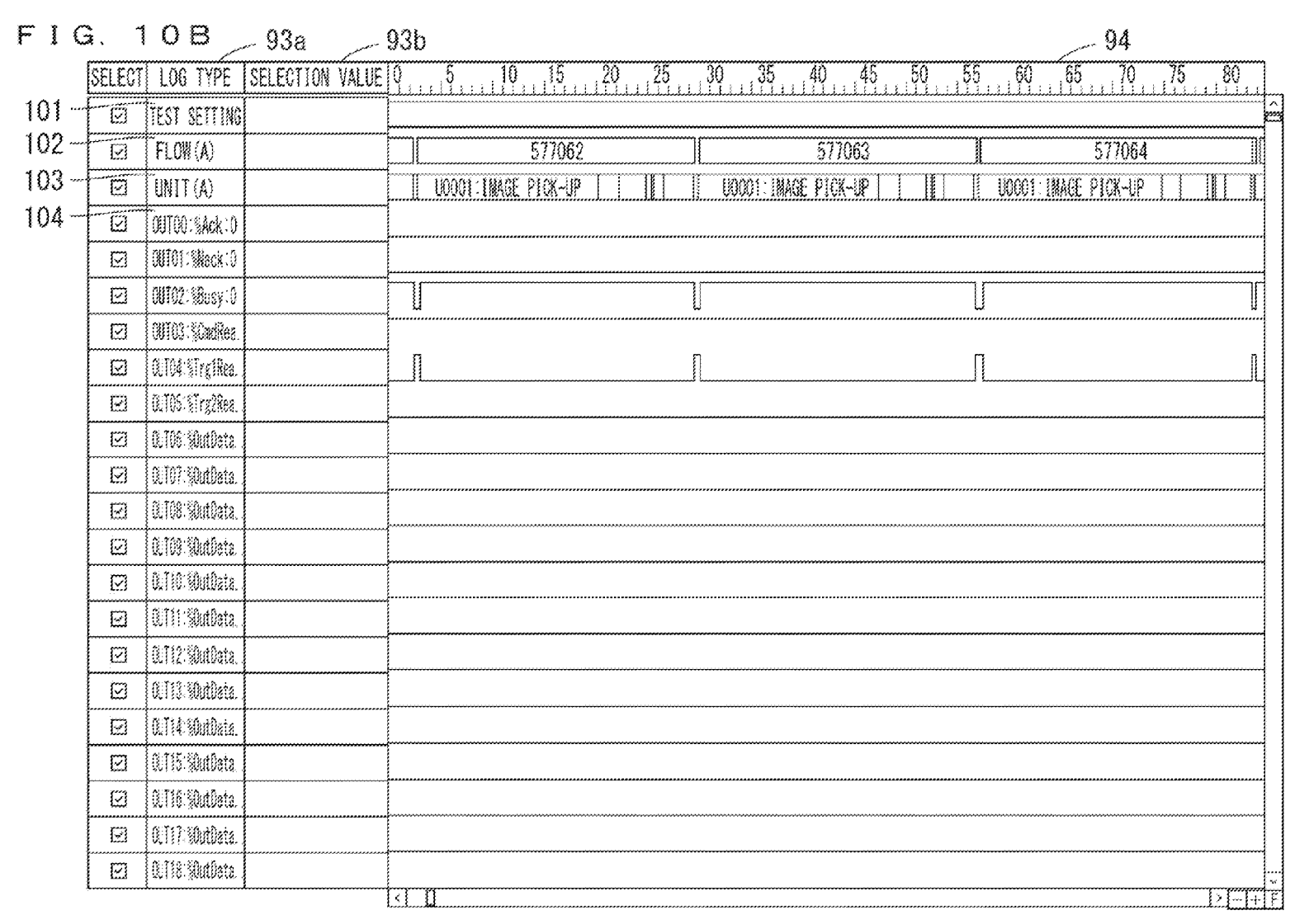

The selection field 97 for a scale is an input field for selecting a scale in a time axial direction in displaying an execution log. FIG. 10A shows a case where 5 msec per scale has been selected as such a scale, and FIG. 11A shows a case where 0.5 msec per scale has been selected as a scale.

Generally, since an image pick-up unit requires the time for waiting for an image pick-up trigger signal to be inputted and image data to be transferred, processing time thereof is long as compared with processing time of other processing units such as a measurement unit. Hence a proportion of the image pick-up unit on the execution log is large as compared with proportions of other processing units. In such a condition, the cursor 110 can be made to jump by operation of the cursor shift button 96, which is extremely convenient as compared with shifting the cursor 110 by operation of a direction key.

The display button 98 for a log condition setting screen is an operational icon for displaying the log condition setting screen 70, and by operation of the display button 98, the log condition setting screen 70 can be displayed on the log view window 90.

<Event Trigger Mode>

FIGS. 12A and 12B are timing charts each showing an example of an operation of the image processing controller 11 in the test support system 100 of FIG. 2, and each shows a condition at the completing time of log collection in event trigger mode. In FIG. 12A, a case of the edge trigger mode is displayed. In FIG. 12B, a case of the level trigger mode is displayed.

In the edge trigger mode, log collection is completed in sync with an input signal (trigger signal) from an input terminal previously specified as an edge trigger input terminal. Namely, log collection is completed in sync with a condition change (startup) of a trigger signal from a low level to a high level.

On the other hand, in the level trigger mode, a logic product of two event trigger signals is referenced, and when one input signal is in the on-state, log collection is completed in sync with shift of the mode of the other input signal to the on-state.

In this example, two input terminals A1 and A2 for level trigger are specified, and a logic value "1" is set as a parameter for determining establishment of a trigger condition with respect to one input terminal A1, and a parameter "startup" for determination is set with respect to the other input terminal A2. In this case, when an input signal "trigger signal 1"

from the input terminal A1 is in the on-state, by shifting the state of an input signal "trigger signal 2" from the input terminal A2 to the on-state, log collection is completed in sync with this startup to the on-state. Namely, only when the trigger signal 1 is in the on-state, log collection is completed in a case of the state change of the trigger signal 2 from the low level to the high level, and when the trigger signal 1 is in the off-state, log collection is not completed even in the case of the state change of the trigger signal 2.

It is to be noted that in the present embodiment, although the case was described where the PC 2 is connected with the image processing controller 11 through a communication network, and an execution log collected by the log collecting section 56 is transferred from the image processing controller 11 to the PC 2 through the communication network, the present invention is not restricted thereto. For example, the execution log collected by the log collecting section 56 may be an execution log to be written into a memory card in the image processing controller 11. The memory card is a detachable recording medium made of a writable non-volatile semiconductor storing device such as a flash memory, and an execution log can be analyzed on the PC 2 by mounting a memory card with the execution log written therein in the PC 2. More particularly in the image processing controller 11, log collection is performed based upon a previously set event trigger condition, and the collected execution log is held in the memory card. After log collection is completed in accordance with establishment of an end condition, the memory card is removed from the image processing controller 11. In the PC 2, by mounting such a memory card, an execution log is displayed on the log view window 90 and then analyzed.

According to the present embodiment, since an execution log is held in association with a processing unit, it is possible to analyze an execution log in association with processing of each processing unit. In particular, since an execution log includes time information showing processing start and processing end of a processing unit, it is possible to facilitate determination as to in which order each processing was executed and when each processing was started and completed. For example, it is possible to see which branch flow was executed after branching by the branching unit.

Moreover, since an execution log includes determination result information with respect to each measurement unit, it is possible to analyze the execution log with a determination result in the process of a series of processing procedure associated with a terminal state. For example, it is possible to see a determination result in the process of repetition by the repeat unit.

What is claimed is:

1. A test support system comprising:
   a camera which photographs an object to be tested, to generate a camera image;
   an image processing controller which acquires the camera image from the camera, extracts a measurement result from the camera image, and determines a quality of the object to be tested based upon this measurement result, to output a determination signal; and
   a program creation apparatus which creates a control program of the image processing controller, wherein
   the program creation apparatus includes
   a processing unit storing part for holding, as processing units, an image pick-up unit that acquires a camera image from the camera based upon an image pick-up trigger signal, and two or more measurement units that extract a measurement result from the camera image acquired by the image pick-up unit,
   a flow chart generating part for arranging the processing units on an execution flow that is started with a start symbol and completed with an end symbol, to generate a flowchart,
   a program generating part for generating a control program for the image processing controller based upon the flowchart, and
   a program transferring part for transferring the control program to the image processing controller,
   the image processing controller includes
   a program storing part for holding the control program,
   a program executing part for repeatedly executing the control program with an acquirement cycle of the camera image taken as a measurement cycle,
   a log collecting part for sampling a terminal state when executing the control program, and holding the terminal state as an execution log shown in time series, and
   a log transferring part for transferring the execution log to the program creation apparatus, and
   the log collecting part holds the execution log in association with the processing unit.

2. The test support system according to claim 1, wherein the execution log includes time information showing processing start and processing end of the processing unit.

3. The test support system according to claim 1,
   wherein the execution log includes determination result information with respect to each of the processing units, the information showing a determination result of the quality of the object to be tested.

4. The test support system according to claim 1, wherein
   the processing unit storing part holds a branching unit that branches an execution flow into two or more branch flows as a processing unit, and
   the execution log includes a branch destination information showing a destination of branching by the branching unit.

5. The test support system according to claim 1, wherein the log collecting part completes collection of the execution log based upon a determination result of the quality of the object to be tested in the measurement unit.

6. The test support system according to claim 1, wherein the log collecting part completes collection of the execution log based upon the time from processing start to processing end of the processing unit.

7. The test support system according to claim 1, wherein the log collecting part completes collection of the execution log based upon overflow of a measurement value or a parameter setting error.

8. The test support system according to claim 1, wherein the program creation apparatus includes:
   a log displaying part for displaying on an edition screen the execution log in association with a time scale;
   a unit select field displaying part for displaying a select field for selecting the processing unit; and
   a cursor shifting part for making a cursor jump on the execution log to a position of the processing unit selected in the select field.

9. An image processing controller which is used in a test support system including
   a camera which photographs an object to be tested, to generate a camera image,
   an image processing controller which acquires the camera image from the camera, extracts a measurement result from the camera image, and determines a quality of the object to be tested based upon this measurement result, to output a determination signal, and a program creation apparatus which creates a control program of the image processing controller, the program creation apparatus including a processing unit storing part for holding, as processing units, an image pick-up unit that acquires a camera image from the camera based upon an image pick-up trigger signal, and two or more measurement units that extract a measurement result from the camera image acquired by the image pick-up unit, a flow chart generating part for arranging the processing units on an execution flow that is started with a start symbol and completed with an end symbol, to generate a flowchart, a program generating part for generating a control program for the image processing controller based upon the flowchart, and a program transferring part for transferring the control program to the image processing controller, the image processing controller comprising:

a program storing part for holding the control program, a program executing part for repeatedly executing the control program with an acquirement cycle of the camera image taken as a measurement cycle, a log collecting part for sampling a terminal state when executing the control program, and holding the terminal state as an execution log shown in time series, and a log transferring part for transferring the execution log to the program creation apparatus, and wherein the log collecting part holds the execution log in association with the processing unit.

* * * * *